United States Patent Office 3,147,198
Patented Sept. 1, 1964

1

3,147,198
C₆ OLEFIN SEPARATION USING A
HALOHYDROCARBON
Kenneth L. Lindsay and James D. Byrd, Baton Rouge,
La., assignors to Ethyl Corporation, New York, N.Y.,
a corporation of Virginia
No Drawing. Filed Oct. 31, 1960, Ser. No. 65,901
10 Claims. (Cl. 202—39.5)

The present invention is concerned with a novel method for separating olefins from mixtures.

While various methods for the separation or purification of chemical compounds are known, distillation techniques are the most desirable and economical. Of necessity, distillation techniques are limited considerably by the properties of the respective components contained in the mixture to be distilled so that this common method of separation is not always applicable. For these reasons, the use of simple or fractional distillation for separating olefins from hydrocarbon streams is applicable only to a limited extent wherein the components to be separated have comparatively divergent boiling points. In many instances, distillation aids such as those used in azeotropic and extractive distillation are required. As far as presently known, no methods of separating a mono-olefin from a mixture containing closely boiling mono-olefins, particularly those having more than 5 carbon atoms, have been employed. This is readily understandable since simple distillation operations are not very effective with mixtures of closely boiling mono-olefins and extractive or azeotropic distillation heretofore has been considered impractical since the individual components of the mono-olefin mixture normally are equally soluble in the solvent employed. For this reason, heretofore extractive distillation operations have not been employed for the separation of a mono-olefin contained in a mixture of other mono-olefins, particularly isomers thereof.

Because of the attractiveness of employing mono-olefins having 5 or more carbon atoms as fiber monomers in polymerization operations, and the fact that most presently known techniques for forming such fiber monomers result in product streams which include the monomer plus its positional isomers, it is desirable to provide an effective means for separating one mono-olefin from other mono-olefins especially positional isomers thereof.

Accordingly, an object of the present invention is to provide a novel and more effective method for purifying or recovering a mono-olefin from other mono-olefins when in admixture therewith. A particular object is to provide a more effective means for separating mono-olefins having at least 5 carbon atoms from a mixture containing isomers of the desired mono-olefin. A specific object of the invention is to provide a novel and more efficient method for separating 4-methyl-1-pentene from 4-methyl-2-pentene by distillation.

It has now been discovered that an effective separation of a mono-olefin from a mono-olefin mixture can be accomplished by distilling the mixture when mixed and dissolved in an essentially inert, organic solvent which has a boiling point greater than any individual mono-olefin contained in the mixture treated and is an organic halide. The method is particularly applicable to mixtures containing only mono-olefins having the same number of carbon atoms and having at least 5 carbon atoms, especially mixtures of vinyl olefins (CH₂=CH—R) with vinylidene olefins

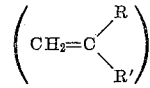

mixtures of vinyl olefins with internal olefins

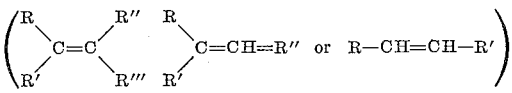

and mixtures of vinylidene olefins with internal olefins, in each instance wherein the former type olefin is lower boiling than the latter type olefin, e.g., a mixture of a vinyl olefin with a vinylidene olefin wherein the vinyl olefin is the lower boiling of the two. In a particularly preferred embodiment, the method comprises treating a mixture of acyclic mono-olefins having 6 carbon atoms, especially a mixture of 4-methyl-1-pentene and 2-methyl-1-pentene, a mixture of 4-methyl-1-pentene and 4-methyl-2-pentene, or a mixture of 2-methyl-1-pentene and 2-methyl-2-pentene. The solvents employed in the distillation operation are preferably the halohydrocarbons. A particularly effective solvent to be employed, especially with mixtures of C₆ mono-olefins comprises tetrachloroethylene. Thus, a specific embodiment of this invention comprises distilling a mixture of 4-methyl-1-pentene, 4-methyl-2-pentene and tetrachloroethylene. Another embodiment comprises the distillation of a mixture of 4-methyl-1-pentene, 2-methyl-1-pentene, and tetrachloroethylene. A still further particular embodiment comprises the distillation of a mixture of 2-methyl-1-pentene, 2-methyl-2-pentene, and tetrachloroethylene.

By the process of this invention, a very effective and efficient separation of mono-olefin products from mixtures of mono-olefins, particularly isomers, is obtained by a simplified technique. The process is particularly advantageous in providing a method for the practical and effective separation of one olefin from another mono-olefin having the same number of carbon atoms, but the olefinic bond in a different position. It has been found that the use of the particular solvents enhances the separation many-fold over that possible by carefully controlled and tedious prior art methods of fractional distillation. This unique result is even more profound in view of the fact that positional isomers of mono-olefins exhibit essentially the same degree of solubility in the solvent employed. Further, the uniqueness of the invention is illustrated by the fact that an olefin and its positional isomers have very close boiling points. For example, the difference in boiling points between 4-methyl-1-pentene and cis-4-methyl-2-pentene is only 2.42° C. Other advantages of the method will be evident as the discussion proceeds.

The present invention will be further understood and illustrated by the following examples and data wherein all parts are by volume unless otherwise indicated.

EXAMPLE I

In numerous runs, a 50–50 mixture of 4-methyl-1-pentene and 4-methyl-2-pentene was distilled while dissolved in an equal volume of indicated solvents. The procedure involved adding 25 parts of the olefin mixture and 25 parts of the solvent to a still equipped with a condenser, an external means for heating, and a means for taking samples of the liquid phase and the vapor phase. A sample was taken of the liquid phase in the still and then the still was heated to reflux for about 1 to 2 hours until equilibrium was reached. Then, a sample was taken of the vapor and both the vapor and liquid samples were subjected to vapor phase chromatographic analysis to determine the respective amounts of each component in each sample. The relative volatilities were obtained according to the following equation:

$$\text{alpha} = \frac{\frac{a}{b} \text{ Vapor}}{\frac{a}{b} \text{ Liquid}}$$

wherein alpha is the relative volatility, "$a$" equals the weight of 4-methyl-1-pentene and "$b$" equals the weight of 4-methyl-2-pentene in the respective phases.

Employing the above technique, numerous runs were made with various solvents to determine the relative volatilities and effectiveness of the present invention. These runs are presented in Table I wherein the alpha value represented is an average of from 2 to as many as 5 individual runs.

Table I

| Run No. | Solvent | Average Alpha |
|---|---|---|
| I | Tetrachloroethylene | 1.49 |
| II | Ethylene dibromide | 1.49 |
| III | Trichloroethylene | 1.45 |
| IV | 1,1,1-Trichloroethane | 1.41 |
| V | 1,1,2-Trichloroethane | 1.26 |
| VI | Triethylamine | 1.25 |
| VII | Nitrobenzene | 1.21 |
| VIII | Methylene Chloride | 1.19 |
| IX | None | 1.16 |

The effectiveness and the uniqueness of the present invention is readily evident from a consideration of the above Table I. Run IX is the base run showing the relative volatility of the mixture of 4-methyl-1-pentene and 4-methyl-2-pentent without one of the unique solvents of this invention indicating that as a practical matter no effective and economical separation is possible without tedious and closely controlled distillation operations requiring an extremely large number of plates or trays. In contrast, merely by conducting the distillation employing the solvents according to the present invention, a many-fold enhancement in separation is obtained. By way of example, when distilling in the absence of the solvent as in Run IX, 2.7 times as many plates are required than when distilling in the presence of tetrachloroethylene as in Run I despite the fact that both 4-methyl-1-pentene and 4-methyl-2-pentene are completely miscible and exhibit essentially identical solubility characteristics in tetrachloroethylene at the temperature of operation.

EXAMPLE II

In order to illustrate the effect upon the relative volatility by variation in the olefin and solvent concentrations, the procedure of Example I was duplicated essentially as described varying the ratio of the 4-methyl-1pentene and the 4-methyl-2-pentent in the initial olefin mixture and the amount of solvent (tetrachloroethylene) employed to the total olefins contained in the mixture. The data obtained are illustrated in Table II.

Table II

RELATIVE VOLATILITY AS A FUNCTION OF OLEFIN AND SOLVENT CONCENTRATIONS

| Run No. | Alpha | r | s | Moles Olefin/Liter | Average Alpha |
|---|---|---|---|---|---|
| I | 1.202 | 0.1128 | 0 | | |
| II | 1.134 | 0.4175 | 0 | | |
| III | 1.149 | 1.000 | 0 | | |
| IV | 1.184 | 1.000 | 0 | 7.93 | 1.169 |
| V | 1.137 | 1.000 | 0 | | |
| VI | 1.162 | 1.000 | 0 | | |
| VII | 1.215 | 2.104 | 0 | | |
| VIII | 1.265 | 0.1060 | 0.12 | | |
| IX | 1.254 | 0.3864 | 0.12 | 7.08 | 1.267 |
| X | 1.283 | 2.001 | 0.12 | | |
| XI | 1.303 | 0.1020 | 0.40 | | |
| XII | 1.321 | 0.3697 | 0.40 | 5.67 | 1.315 |
| XIII | 1.321 | 1.985 | 0.40 | | |
| XIV | 1.478 | 1.000 | 1.00 | | |
| XV | 1.504 | 1.000 | 1.00 | 3.97 | 1.486 |
| XVI | 1.475 | 1.000 | 1.00 | | |

Alpha = Relative volatility.
$r$ = Ratio of 4-methyl-1-pentene to 4-methyl-2-pentene (weight).
$s$ = Volume ratio of solvent (tetrachloroethylene) to olefins.

From a consideration of the above Table II, it is indicated that in the absence or presence of the solvent, there is little effect on the relative volatility by varying the ratio of 4-methyl-1-pentene to 4-methyl-2-pentene in the olefin mixture. However, by increasing the volume ratio of the solvent to the olefins ("$s$"), it is evident that the relative volatility of 4-methyl-1-pentene in the mixture increases progressively with increases in this ratio. Thus, in general, the more solvent employed, the greater the relative amount of 4-methyl-1-pentene contained in the vapor phase.

EXAMPLE III

Again employing the procedure of Example I, a study was made of the effect of solvent concentration on various olefin systems wherein in each instance a 50–50 mixture by volume of two olefins was refluxed in tetrachloroethylene solvent.

Table III

EFFECT OF SOLVENT CONCENTRATION OF VARIOUS OLEFIN SYSTEMS

| Run No. | Olefin Mix | Parts Solvent/25 Parts Olefin | Alpha |
|---|---|---|---|
| I | {$a$=4-methyl-1-pentene<br>$b$=2-methyl-1-pentene} | 0<br>10<br>25<br>50 | 1.412<br>1.806<br>1.749<br>1.678 |
| II | {$a$=4-methyl-1-pentene<br>$b$=cis-4-methyl-2-pentene} | 0<br>10<br>25<br>50 | 1.087<br>1.160<br>1.175<br>1.200 |
| III | {$a$=2-methyl-1-pentene<br>$b$=2-methyl-2-pentene} | 0<br>10<br>25<br>50 | 1.278<br>1.473<br>1.516<br>1.577 |

Thus, the above table indicates both the improvement in separation of the indicated mixtures by employing solvents of this invention in the distillation as well as the general progressive enhancement in separation as the amount of solvent in increased. In certain instances, such as Run I in the above table, it appears that with certain solvents and certain olefins, a maximum concentration of solvent is possible for the greatest effectiveness, in this instance at the ratio of 10 parts of solvent per 25 parts of olefin.

As illustrated by the above examples, the process is applicable to the separation or purification of mixtures of mono-olefins. While the process is generally applicable to a variety of mono-olefin mixtures, it is particularly applicable to mixtures containing at least one vinyl mono-olefins and at least one vinylidene mono-olefin or mixtures containing at least one vinyl mono-olefin and at least one internal mono-olefin, or mixtures containing at least one vinylidene mono-olefin and at least one internal mono-olefin, especially wherein, in each instance, the former type olefin is lower boiling than the latter type olefin, e.g., in the first group, the vinyl olefin is lower boiling than the vinylidene olefin. By the term "vinyl mono-olefin," it is intended to denote a terminally unsaturated olefin wherein only one carbon linkage is attached to the second carbon atom ($CH_2=CH-R$). By the term "internal mono-olefin," it is intended to denote olefins wherein the olefinic bond is between two non-terminal carbon atoms,

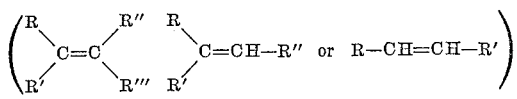

including cyclic olefins. By the term "vinylidene mono-olefin," it is intended to denote a terminally unsaturated mono-olefin that has two carbon linkages attached to the second carbon atom

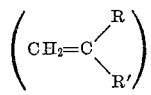

In general, the olefins will have at least 4 carbon atoms and up to and including about 10 and higher carbon atoms. Among other criteria of olefinic mixtures to which the process is particularly applicable are that the olefins contained in the mixture have boiling points within about 20° C. of each other and especially within about 10° C. of each other, as well as the feature that all of the olefins have boiling points below the boiling point of the solvent which is employed. By way of example of olefinic mixtures which can be effiectively treated according to the process of the invention, the following mixtures are illustrative: 4-methyl-1-pentene mixed with 2-methyl-1-pentene; 4-methyl-1-pentene mixed with 2-methyl-2-pentene; 4-methyl-1-pentene mixed with 4-methyl-2-pentene; 2-methyl-1-pentene mixed with 2-methyl-2-pentene; 4-methyl-1-pentene mixed with both cis- and trans-4-methyl-2-pentene, 2-methyl-1-pentene, and 2-methyl-2-pentene; pentene-1 mixed with pentene-2; hexene-1 mixed with hexene-2 or hexene-3 or both; 3-methyl-1-pentene mixed with 3-methyl-2-pentene; 3-ethyl-1-pentene mixed with 3-ethyl-2-pentene; 2-ethyl-1-butene mixed with 3-methyl-2-pentene; 3-methyl-1-pentene mixed with 2-ethyl-1-butene; 2-methyl-1-hexene mixed with 5-methyl-1-hexene or 5-methyl-3-hexene, or both; 1-octene mixed with 2, 3, or 4-octene and combinations thereof; 7-methyl-1-octene mixed with 2-methyl-1-octene, 2-methyl-2-octene, 2-methyl-3-octene, or 2-methyl-4-octene or combinations thereof; 1-decene mixed with 2-, 3-, 4-, or 5-decene or combinations thereof; 8-methyl-1-nonene mixed with 2-methyl-1-nonene, 2-methyl-2-nonene, 2-methyl-3-nonene, 2-methyl-4-nonene, or 2-methyl-5-nonene or combinations thereof; alpha-pinene mixed with beta-pinene; methylenecyclopentane mixed with 1, 2, or 3-methylcyclopentene, and the like. In a preferred embodiment of the invention, the olefinic mixtures comprise such olefins which are acyclic and contain only carbon and hydrogen atoms. Further, the process is especially unique and applicable to such acyclic olefins contained in a mixture of such olefins which individually have the same number of carbon atoms and carbon skeleton and thus are positional isomers of one another, particularly those having 6 carbon atoms and branching. Such mixtures are especially preferred and the greatest advantage of the separation of this invention is achieved in these instances. In a more particularly preferred embodiment, mixtures of 4-methyl-1-pentene with 4-methyl-2-pentene; 4-methyl-1-pentene with 2-methyl-1-pentene; and 2-methyl-1-pentene with 2-methyl-2-pentene are particularly well suited to the process of this invention.

The solvents which are employed in the distillation for separating and purifying the mono-olefins according to this invention are the organic halides. In general, such solvents are essentially inert, organic, and liquid at the distillation conditions. Such solvents are essentially inert in the sense that they do not degrade the olefins contained in the mixture treated. Among further criteria of such solvents are that, in general, the olefins contained in the mixture exhibit some solubility therein and it is preferable that the olefins be completely miscible in the solvent at the temperature of operation. Likewise, the solvent should have a higher boiling point than any of the olefins contained in the mixture. It is also desirable that the solvent be readily separable from the higher boiling olefin contained in the mixture by the usual physical separation techniques, such as distillation, extraction with water, and the like. In this connection, it is especially preferred to employ solvents which boil at least 10° and preferably greater than 20° higher than the boiling point of the highest boiling olefin contained in the mixture at the operating conditions. Typical, but non-limiting examples of the organic halide solvents employable in the process include bromopropene, allyl bromide, allyl iodide, chlorobenzene, bromobenzene, beta-chlorostyrene, n-butyl chloride, cyclohexyl chloride, benzyl chloride, n-octyl chloride, the butyl bromides, the pentyl bromides, the butyl iodides, the pentyl iodides, fluorobenzene, the fluoro toluenes, the chloro toluenes, iodobenzene, chloroform, 1,2-dichloropropane, 1,1,1-trichloroethane, carbon tetrachloride, trichloroethylene, 1-bromo-2-chloroethane, ethylidene bromide, 1,1,2-trichloroethane, tetrachloroethylene, 1,1,1,2- or 1,1,2,2-tetrachloroethane, propylene bromide, bromoform, benzal chloride, benzo trichloride, and the like with the hydrocarbon halides, especially polyhalo-hydrocarbons being preferred. Thus, equally satisfactory improved separation is achieved when any of these or other such solvents are substituted in the above and other examples. In general, it is also preferable that the solvent employed be liquid under standard conditions and have a boiling point below about 250° C. at standard conditions. The polyhalo hydrocarbons comprise a particularly preferred group of solvents to be employed because of their economy, greater enhancement in relative volatility, and easier handling in the systems. In a more preferred and especially unique embodiment of this invention, the solvents employed are the polyhalo hydrocarbons, particularly the polychloro- and bromoalkyl and alkenyl solvents, among which tetrachloroethylene, ethylene dibromide, trichloroethylene, 1,1,1-trichloroethane, and 1,1,2-trichloroethane comprise especially unique embodiments with tetrachloroethylene being most preferred. It has been found that these polyhalo hydrocarbons bring about exceptional improvements in relative volatilities for the olefin systems.

The method of this invention is applicable to all types of mixtures of mono-olefins which contain at least 2 different olefins of the type described hereinbefore of close boiling points. Thus, there can be 2, 3, 4, or even more different mono-olefins contained in the mixture treated. It is especially applicable to mixtures of two different mono-olefins, particularly two isomeric mono-olefins as described above. The proportion of the olefins contained in the mixture is not critical since the method is quite effective in separating a mixture of 1 percent by volume or lower or one olefin with 99 percent by volume or higher of another olefin and vice versa. As a practical matter, the starting mixtures will usually contain at least about 5 percent by volume of each mono-olefin. The amount of solvent employed in relation to the total amount of olefin treated by volume is likewise subject to considerable latitude. As indicated by the above tables, in general, the more solvent present, the greater the enhancement in relative volatility. Thus, the amount used is dictated primarily by practicalities, and in general, between about 5 to 80 percent by volume of solvent is employed based upon the total mixture of the olefin and solvent. When amounts less than about 5 percent are employed, the improvement in separation effected is not sufficient for practical operation. For best results, it is usually preferred to employ between about 20 to 50 percent by volume of the solvent based upon the total volume of the solvent and the olefin mixture distilled.

General distillation procedures and equipment are applicable to the method of this invention. Thus, the invention is applicable to both continuous and batch-type operations. By way of example, the olefin mix and solvent can be added to a still which is merely heated to the reflux temperature of the mixture at the pressure of operation and the product continuously withdrawn from the top and the residue then subjected to a second distillation for separation of the solvent from the remaining olefin or olefins. Likewise, a multiplate or packed column can be employed wherein the olefin mix is continuously fed either pre-mixed with the solvent or at a point below the point of entry of the solvent to the column and the distillation continuously performed by operating at the boiling point of the desired olefin at the top of the column and, if desired, with particular reflux ratios readily ascertainable from the relative volatilities. The residue at the bottom of the column is then continuously withdrawn and transmitted to a second column for separation of the solvent from the remaining olefin or olefins and then the solvent is recycled to the first column. Other similar such distillation operations will now be evident. The temperature and pressure conditions employed in the method of the present invention are not critical since improvement in volatility is achieved irrespective of these conditions. In general, the distillation is conducted at the boiling point of the mixture at the pressure of operation, that is, under conditions such to maintain equilibrium between the vapor and the liquid at each plate or stage in the distillation apparatus.

The following examples will serve to illustrate additional embodiments of the present invention.

EXAMPLE IV

In this run, two distillation columns of 50 plates each, equipped with sieve-trays, were connected in series so that from the bottom of the first column, olefin residue and solvent could be continuously withdrawn and passed to the second column for feeding between the 10th and 11th plates and from the bottom of the second column, the solvent could be continuously withdrawn for feeding to the first column between the 40th and 41st plates along with olefin feed mix, withdrawing as overhead from the first column, the lowest boiling olefin contained in the mix and from the second column the residue olefins. Employing this equipment, a mixture of 80 percent 4-methyl-1-pentene and 20 percent 2-methyl-1-pentene with an equal volume of tetrachloroethylene was fed at the indicated location into the first column and the still heated to maintain a continuous overhead of 4-methyl-1-pentene product from the first column while continuously withdrawing the residue olefin and tetrachloroethylene for feeding to the second column at the indicated location which in turn was heated to above the boiling point of 2-methyl-1-pentene. From the bottom of the second column, tetrachloroethylene was continuously withdrawn for feeding to the first column. When steady state conditions were obtained employing the system and the above conditions, a sample of the overhead from column 1 was taken which analyzed 99.26 percent 4-methyl-1-pentene with the remainder being 2-methyl-1-pentene and the overhead from the second column analyzed 36.22 percent 4-methyl-1-pentene and 63.78 percent 2-methyl-1-pentene.

EXAMPLE V

A mixture of 80 percent by weight of 4-methyl-1-pentene and 20 percent of 4-methyl-2-pentene is fed at an intermediate point to a 20-plate continuous bubble cap distillation column operated at an overhead temperature of 55° C. and atmospheric pressure. Tetrachloroethylene is fed to the same column at a higher point at such a rate that the concentration of tetrachloroethylene within the column below the tetrachloroethylene feed point is about 50 percent. A stream consisting of approximately 95 percent 4-methyl-1-pentene and 5 percent 4-methyl-2-pentene is taken overhead. The effluent from the bottom of the column is fed to a second 5-plate column at an intermediate point. A mixture of approximately 20 percent 4-methyl-1-pentene and 80 percent 4-methyl-2-pentene is taken overhead from the second column at a temperature of 59° C. and atmospheric pressure, and tetrachloroethylene is recovered from the bottom of the second column and recycled to the first column.

If the same separation is attempted in a single column without the use of an extractive solvent, approximately 50 plates are required.

EXAMPLE VI

Employing the procedure of Example V, the same conditions are used with exception that the olefin feed comprises 5 percent 4-methyl-1-pentene and 95 percent 2-methyl-1-pentene. A high recovery of 4-methyl-1-pentene having a purity of about 98 percent is obtained as overhead from the first column.

EXAMPLE VII

The equipment and procedure of Example V is employed with exception that an intermediate distillation column is connected in series for transmittal of residue olefin and solvent from the bottom of the first column to the middle of the second column and from the bottom of the second column, solvent plus residue olefin is transmitted to the third column wherein separation of the residue olefin and solvent are achieved with the solvent being withdrawn from the bottom of the third column for recycling to the first column. In this run, a mixture of approximately 10 percent 4-methyl-1-pentene, 30 percent 2-methyl-1-pentene, and 60 percent 2-methyl-2-pentene is fed to the first column with an equal volume of tetrachloroethylene with the column operated at an overhead temperature of about 55° C., the second column being operated at an overhead temperature of about 61° C., and the third column being operated at an overhead temperature of about 67° C. With steady state conditions, essentially pure 4-methyl-1-pentene is withdrawn as overhead from the first column, essentially pure 2-methyl-1-pentene is withdrawn as overhead from the second column and essentially pure 2-methyl-2-pentene is withdrawn as overhead from the third column with the tetrachloroethylene being recycled from the bottom of the third column to the first column.

EXAMPLE VIII

The procedure of Example V is repeated essentially as described with exception that ethylene dibromide is substituted as solvent. Upon analysis of the overhead of both columns 1 and 2 after steady state conditions have been reached, it is found that the product of column 1 comprises about 98.5 percent 4-methyl-1-pentene and the product of column 2 comprises 4-methyl-1-pentene and 2-methyl-1-pentene with the amount of 4-methyl-1-pentene substantially less than that in the starting mixture.

When Examples IV through VIII are repeated substituting benzyl chloride, 1,2-dichloropropane, o-chlorotoluene, 2,4-dichlorotoluene, bromoform, and the like halohydrocarbons as solvent, equally satisfactory results are obtained.

EXAMPLE IX

Example VII is repeated essentially as described with the exception that the olefin mixture comprises about 10 percent 3-methyl-1-pentene, 30 percent 2-ethyl-1-butene, and 60 percent 3-methyl-2-pentene and the overhead temperatures are adjusted to the boiling point of each compound in the respective columns. Essentially pure 3-methyl-1-pentene is withdrawn as overhead from the first column, essentially pure 2-ethyl-1-butene is withdrawn as overhead from the second column, and essentially pure 3-methyl-2-pentene is withdrawn as overhead from the third column.

EXAMPLE X

A charge of a 50–50 mix of octene-1 and octene-2 with an equal volume of ethylene diamine is distilled in a stainless steel fractionation column coming over at a temperature of 123° C. at atmospheric pressure. In this manner, essentially pure octene-1 is recovered from the crude mixture.

EXAMPLE XI

A mixture of 20 percent by volume of 1-decene and 80 percent 2-decene with an equal volume of nitrobenzene is distilled at 170° C. at atmospheric pressure. In this manner, essentially pure 1-decene is recovered as overhead.

EXAMPLE XII

A mixture comprising 20 percent 1-butene and 80 percent 2-butene and an equal volume of carbon tetrachloride is distilled at 50° C. and 86 p.s.i. absolute pressure whereby essentially pure 1-butene is recovered as overhead leaving the 2-butene as residue dissolved in carbon tetrachloride.

When the above example is repeated substituting tetrachloroethylene equally good results are obtained.

The above examples are presented by way of illustration and it is not intended that the invention be limited thereto. From these examples, it will now be evident that other solvents and olefin mixtures can be employed within the teaching of this invention to achieve similar enhancement in relative volatility for effective separation and purification of mono-olefins.

The olefins obtained according to the process of the invention are of considerable utility. Foremost among their usage is their polymerization by conventional techniques to form polymers which are useful in fabrics such as clothing, carpeting, tire cord, and the like. Thus, they are excellent fiber monomers. Such methods for their polymerization are described in British Patents 823,309 and 808,144 dealing primarily with the formation of polymers of 4-methyl-1-pentene and the like olefins. Another technique for polymerization involves the employment of Ziegler-type catalysts at temperatures between about 0 to 200° C. and pressures up to about 5000 p.s.i. A still further use of the products obtained is their isomerization by known techniques to other positional isomers wherein the double bond is shifted from one position to another. An additional use is the reaction of the recovered olefins with diborane, preferably in the presence of an ether such as the dimethyl ether of diethylene glycol, at temperatures from 0° to about 50° C. and higher to produce the corresponding organoboranes. For example, when 2-methyl-1-pentene is reacted with diborane in the dimethyl ether of diethylene glycol at room temperature, tri-(2-methyl-1-pentyl)borane is obtained in good yield. This product is useful in alkylation reactions to form other metal alkyls or can be isomerized for recovery of 4-methyl-1-pentene therefrom. Likewise, when any of the olefins purified according to the present invention is reacted with trialkylaluminum or boron compounds, especially triisobutylaluminum, at temperatures of about 150° C. and higher, the corresponding trialkylaluminum and boron derivative of the reacting olefin is obtained. Other uses for the olefins separated according to this invention will now be evident.

Having thus described the process of this invention, it is not intended that it be limited except as set forth in the following claims.

We claim:

1. A method for effectively separating a mono-olefin from a hydrocarbon mixture consisting essentially of at least two mono-olefinic hydrocarbons each having six carbon atoms in the molecule and the same carbon skeleton but differing in the position of the double bond, which method comprises distilling the mixture when mixed and dissolved in an essentially inert halohydrocarbon having a boiling point greater than any individual mono-olefinic hydrocarbon contained in the mixture treated, selected from a group consisting of tetrachloroethylene, ethylene dibromide, trichloroethylene, 1,1,1-trichloroethane and 1,1,2-trichloroethane.

2. The method of claim 1 wherein said solvent is tetrachloroethylene.

3. The method of claim 1 wherein said solvent is trichloroethylene.

4. The method of claim 1 wherein said solvent is 1,1,1-trichloroethane.

5. The method of claim 1 wherein said solvent is 1,1,2-trichloroethane.

6. The method of claim 1 wherein said solvent is ethylene dibromide.

7. The method of claim 1 wherein the mixture of mono-olefinic hydrocarbons includes at least two members of the group consisting of 4-methyl-1-pentene, 2-methyl-1-pentene, and 4-methyl-2-pentene.

8. The method of claim 1 wherein the mixture of mono-olefinic hydrocarbons consists essentially of about 80 percent by weight of 4-methyl-1-pentene and about 20 percent by weight of 4-methyl-2-pentene.

9. A method for the separation of 4-methyl-1-pentene from a mono-olefin mixture consisting essentially of 4-methyl-1-pentene and at least one member of the group consisting of 4-methyl-2-pentene, 2-methyl-1-pentene, and 2-methyl-2-pentene which comprises distilling said mixture while in admixture with tetrachloroethylene.

10. A method for the separation of 4-methyl-1-pentene from 2-methyl-1-pentene which comprises distilling a mixture of 4-methyl-1-pentene, 2-methyl-1-pentene, and tetrachloroethylene.

References Cited in the file of this patent

UNITED STATES PATENTS

| | | |
|---|---|---|
| 2,365,912 | Souders | Dec. 26, 1944 |
| 2,395,016 | Schulze et al. | Feb. 19, 1946 |
| 2,415,006 | Hachmuth | Jan. 28, 1947 |
| 2,813,141 | Mathis et al. | Nov. 12, 1957 |
| 2,952,717 | Fleck et al. | Sept. 13, 1960 |